United States Patent

Leffmann

[15] 3,651,402
[45] Mar. 21, 1972

[54] SUPERVISORY APPARATUS
[72] Inventor: Paul H. Leffmann, Scottsdale, Ariz.
[73] Assignee: Honeywell Inc., Minneapolis, Minn.
[22] Filed: Jan. 27, 1969
[21] Appl. No.: 797,355

Related U.S. Application Data

[63] Continuation of Ser. No. 520,400, Jan. 13, 1966.

[52] U.S. Cl. ...... 324/158 MG, 318/490, 324/83 A, 324/177
[51] Int. Cl. ...... G01r 31/00, G01r 25/00
[58] Field of Search ...... 324/158, 83, 158 SM, 158 MG, 324/83 A, 177; 318/490, 175, 178, 179; 310/162, 163

[56] References Cited

UNITED STATES PATENTS

| | | | |
|---|---|---|---|
| 3,003,104 | 10/1961 | Geyger | 324/83 X |
| 904,693 | 11/1908 | Griffin | 318/490 X |
| 1,889,553 | 11/1932 | Keinath et al. | 324/83 X |
| 1,918,977 | 7/1933 | Marrison | 318/490 |
| 2,900,507 | 8/1959 | Rogers | 324/83 X |

Primary Examiner—Rudolph V. Rolinec
Assistant Examiner—Ernest F. Karlsen
Attorney—Roger W. Jensen, Charles J. Ungemoch and George W. Field

EXEMPLARY CLAIM

1. The method of testing a hysteresis synchronous motor having a rotor and a pair of stator windings the first of which is energized directly from an alternating voltage source and the second of which is energized from the source through a capacitor, which comprises the steps of energizing the motor, monitoring the phase angle relation between the alternating voltage across said second winding and a reference alternating voltage of preset fixed phase, and confirming the presence in said relation of a characteristic representative of satisfactory motors.

5 Claims, 4 Drawing Figures

3,651,402

PATENTED MAR 21 1972

SHEET 1 OF 2

INVENTOR.
PAUL H. LEFFMANN

BY George Field

ATTORNEY

INVENTOR.
PAUL H. LEFFMANN

BY
George Field
ATTORNEY

SUPERVISORY APPARATUS

This application is a continuation of Ser. No. 520,400 filed Jan. 13, 1966.

This invention relates to the field of supervisory apparatus, and more specifically comprises apparatus for indicating, at a monitoring point, that a remotely located hysteresis synchronous motor is in proper operating condition and has come up to synchronous speed. The apparatus may be readily designed to supervise the operation of several motors at once, which is desirable in such applications as inertial platforms where the spin motors of two or more gyroscopes must be operating properly if successful platform performance is to be achieved.

Figure 3:
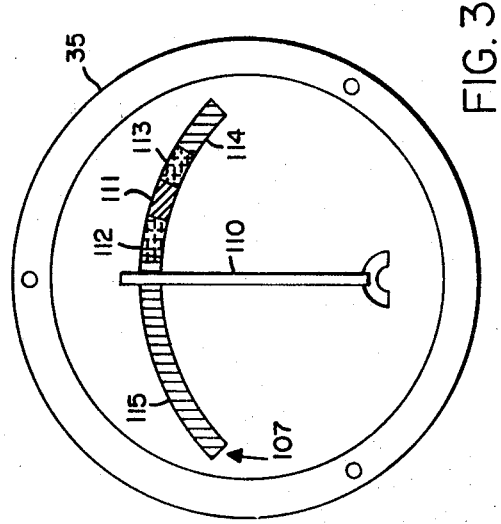
Figure 4:
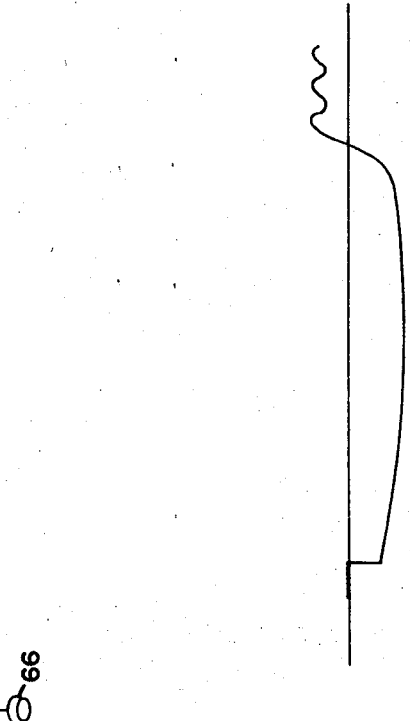

For a better understanding of the invention, its advantages, and objects attained by its use, reference should be had to the subjoined drawing, which forms a further portion hereof. In the drawing, FIG. 1 shows the invention embodied in three channels to supervise the operation of the three spin motors of a gyro assembly or an inertial platform, FIG. 2 is a schematic showing of one channel of FIG. 1, FIG. 3 is a pictorial representation of a supervisory instrument, in the form of an indicating meter, used in FIG. 2, and FIG. 4 is a curve illustrating in general terms the operation of the invention.

Figure 1:
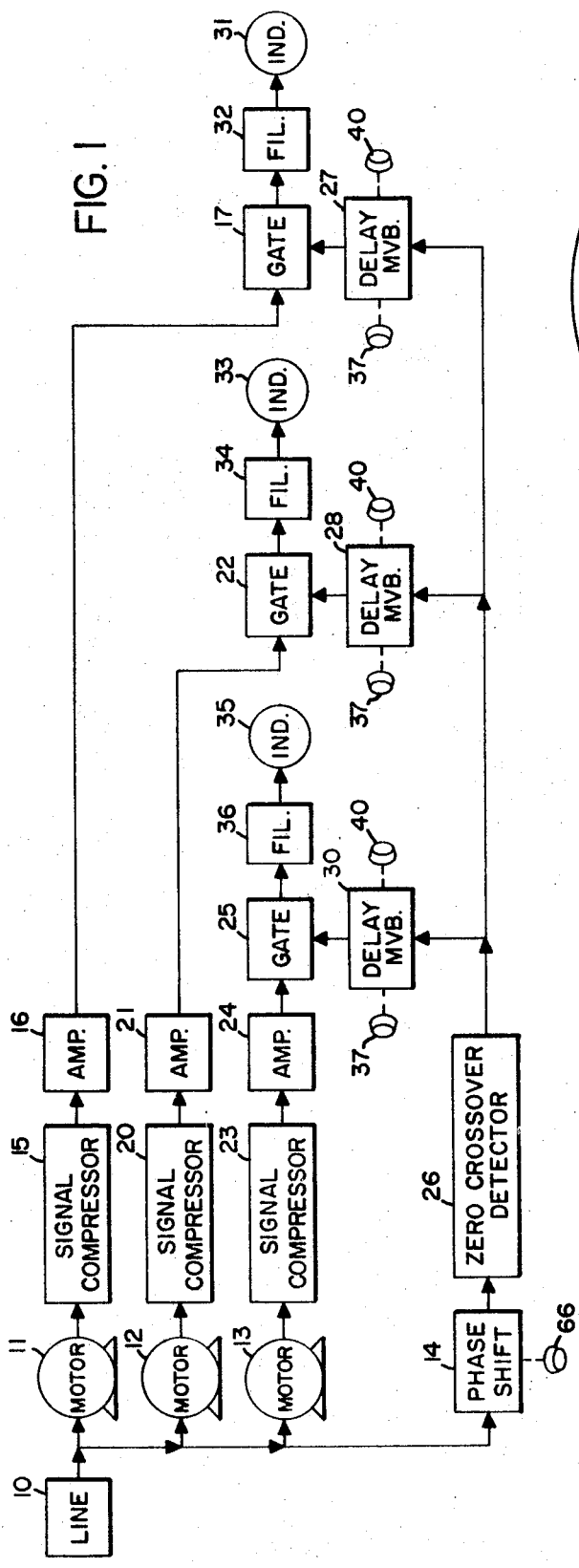
Figure 2:
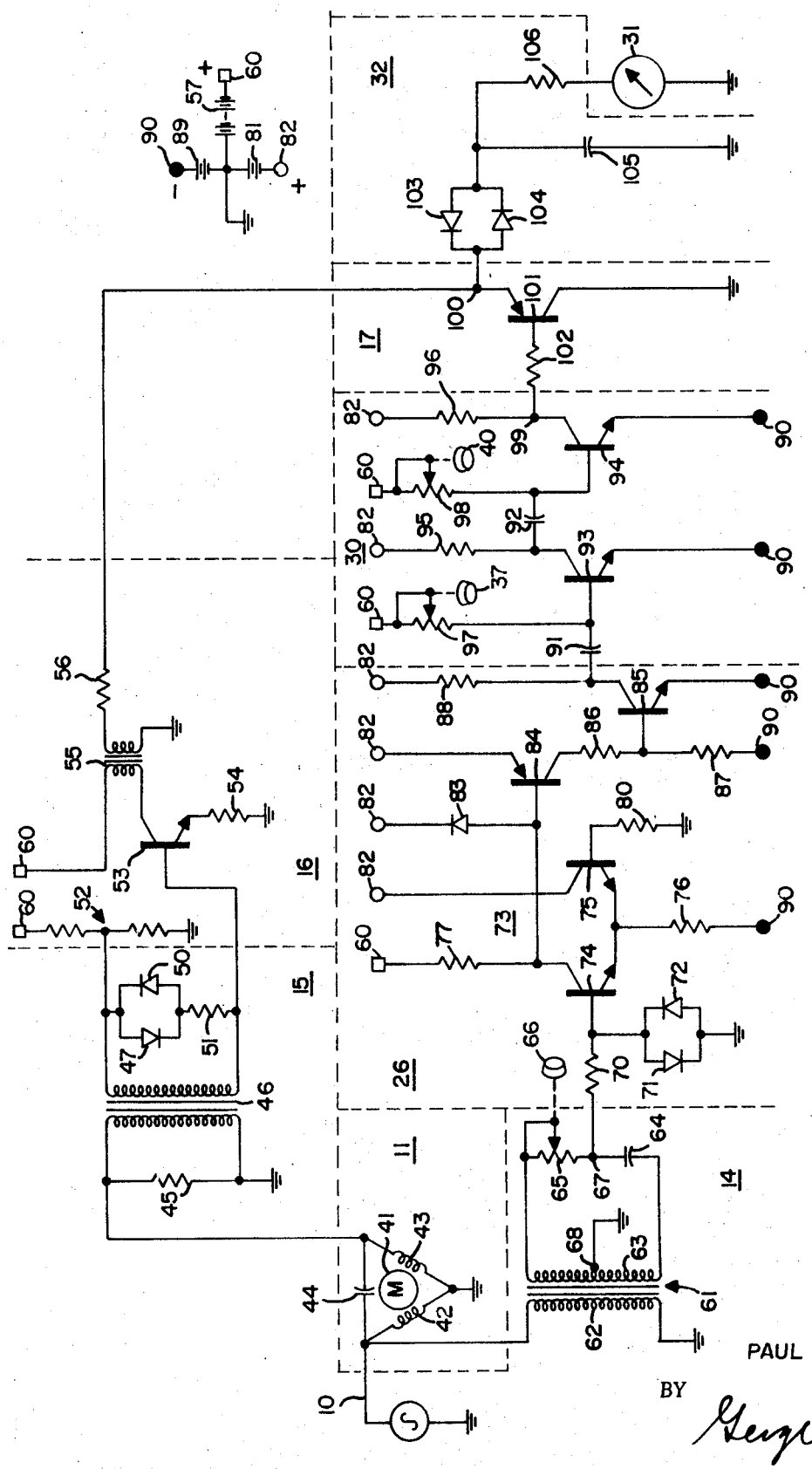

As shown in FIG. 1, an AC line 10 supplies electrical energy to a set of hysteresis synchronous motors 11, 12, and 13 and to a phase shifter 14. The voltage across the reactively energized winding of motor 11 is supplied through a signal compresser 15 and an amplifier 16 to a first normally closed shunt gate circuit 17. The voltage across the reactively energized winding of motor 12 is supplied through a signal compresser 20 and an amplifier 21 to a second normally closed shunt gate circuit 22. The voltage across the reactively energized winding of motor 13 is supplied through a signal compresser 23 and an amplifier 24 to a third normally closed shunt gate circuit 25. The output of phase shifter 14 is supplied to a zero cross-over detector or high gain clipping amplifier 26. The output of detector 26 is supplied to three delay multivibrators 27, 28, and 30, which supply signals to open and close gate circuits 25, 22, and 17 respectively.

In the normally closed condition of each shunt gate circuit, the signal from the preceding amplifier is prevented from going further, but when the gate circuits are open by signals from the multivibrators, a first indicator 31 is energized through a filter 32 from amplifier 16, a second indicator 33 is energized through a filter 34 from amplifier 21, and a third indicator 35 is energized through a filter 36 from amplifier 24. It will be appreciated that the gate circuits do not necessarily open at the same time.

Each multivibrator has a first manual adjustment 37 for varying the delay before opening of the gate occurs, and a second manual adjustment 40 for varying the length of time the associated gate is open.

Elements 15, 16, 17, 27, 31, and 32 comprise a first channel of the apparatus, elements 20, 21, 22, 28, 33, and 34 comprise a second channel, and elements 23, 24, 25, 30, 35, and 36 comprise a third channel; elements 10, 14 and 26 are common to all the channels.

The first channel is shown schematically in greater detail in FIG. 2. Motor 11 is shown to have a rotor 41, a first winding 42 directly energized from source 10, and a second winding 43 in physical quadrature with winding 42 and reactively energized from source 10 through a capacitor 44.

The voltage across winding 43 is supplied to compresser 15 which is shown to comprise a load resistor 45, a transformer 46, a pair of diodes 47 and 50 connected in parallel in opposite polarity, and a resistor 51 in series with the parallel combination across the transformer output.

Amplifier 16 is energized from compresser 15 and is shown to comprise a voltage divider 52, an NPN transistor 53, an emitter resistor 54, a coupling transformer 55, and a series resistor 56. Amplifier 16 is powered from a source 57 of 15 volts having a positive terminal 60 and a grounded negative terminal.

Phase shifter 14 is shown to comprise a transformer 61 having a primary winding 62 energized from source 10 and a secondary winding 63 with a grounded center tap 68. Connected in series across winding 63 are a capacitor 64 and a variable resistor 65 having a manual adjustment 66. The output of phase shifter 14 appears between ground and a terminal 67 common to resistor 65 and capacitor 64.

Zero cross-over detector 26 is shown to comprise a series resistor 70, a shunt clipper including diodes 71 and 72, and a differential amplifier 73 including NPN transistors 74 and 75 with a common emitter resistor 76, a collector resistor 77, and a base resistor 80. Amplifier 73 is powered from 15-volt source 57 and a source 81 of 3 volts having a positive terminal 82 and a grounded negative terminal. Detector 26 further comprises a diode 83, a PNP transistor 84, an NPN transistor 85, and further resistors 86, 87, and 88: transistors 84 and 85 are powered from terminal 82. Bias for transistors 74, 75, 84, and 85 is obtained from a source 89 having a negative terminal 90 and a grounded positive terminal.

Delay multivibrator 27 is shown to comprise coupling capacitors 91 and 92, NPN transistors 93 and 94, fixed resistors 95 and 96, and variable resistors 97 and 98 having manual adjustments 37 and 40. Transistors 93 and 94 are powered from terminals 60 and 82 and are biased from terminal 90. Operation of adjustment 37 varies the delay between the instant of application of a signal through capacitor 91 and the instant at which the multivibrator switches. Operation of adjustment 40 varies the length of the interval during which the multivibrator remains switched. The output of multivibrator 30 appears at a terminal 99 common to resistor 96 and the collector of transistor 94.

Gate 17 is shown to comprise a PNP transistor 101 having its emitter energized through resistor 56 and its base connected through a resistor 102 to terminal 99 of multivibrator 30. In the normal condition of multivibrator 30, transistor 101 is conductive, and an output terminal 100 common to resistor 56 and the emitter of transistor 101 is essentially at ground potential.

Filter 32 is shown to comprise a pair of reverse-connected isolating diodes 103 and 104, a filter capacitor 105, and a dropping resistor 106.

Indicator 31 is a center zero DC meter: as shown in FIG. 3, it has a specially prepared scale comprising a colored band 107 extending the full length of travel of a pointer 110. As indicated by the cross-hatching in the figure, the band comprises a short section 111 of green displaced from the center of the band, and flanked on each side by short sections 112 and 113 of yellow: the remainder of the band is red, and includes a short portion 114 near one end and a long portion 115 including more than half of the other end.

The operation of my apparatus is based on the phase change that is known to occur in the voltage across the reactively energized winding of motor 11 as the motor comes up to speed: I refer to this voltage as a signal voltage, and I measure the phase change with respect to a reference voltage derived from source 10 and appearing at terminal 100. The time relation between the reference voltage and the voltage from source 10 is determined by adjustments 66 and 37, the former being a coarse adjustment common to all channels and the latter being a fine adjustment individual to a single channel.

FIG. 4 is a plot of the phase angle of the signal voltage with respect to time, not to any particular scale. When the motor is energized, an abrupt phase angle indication appears which changes slowly as the motor accelerates, first increasing and then decreasing: the total variation in phase angle during this period may be in the neighborhood of 10 degrees and is shown in the left hand portion of the figure. Not heretofore known is the fact that if a motor is in proper operating condition and is free from mechanical overload, there is a sudden sharp change in phase angle as the motor achieves synchronous speed, and the phase angle thereafter oscillates continuously through a small range. These effects are shown in the right hand part of FIG. 4, to a somewhat larger scale. Marginal motors may exhibit the same general phase angle but approach it much more gradually, without the slight final overshoot and oscillation. This characteristic has been found to comprise a very successful test for the condition of the spin motors of precision gyroscopes, and moreover is a test which can be used for remote monitoring of the starting of such motors in actual use as well as for inspection.

The use of my apparatus is as follows. The motors to be monitored or tested are connected to line 10 and to compressors 15, 20, etc., and are energized: the multivibrators are set near the middles of their ranges for both delay and operating interval. When the motors have come up to speed, phase shifter 14 is adjusted until one of indicators 31, 33, and 35 has its pointer oscillating about the center of green area 111, and the adjusting means 37 of the multivibrators associated with the other two indicators are adjusted until the other two pointers are similarly oscillating about the centers of the green areas. The interval adjusting means 40 of the multivibrators are next operated until the needle oscillations remain within the green areas. The motors are now deenergized, allowed to decelerate to a standstill, and are then renergized, one at a time if necessary, and the movement of needles 110 of the associated indicators observed to confirm the presence of a sudden "junp" from the red area to the green area as synchronous speed is achieved. The apparatus is now properly adjusted, and may remain connected to the motors in question. If at any future time, when a motor is energized, the associated needle does not reach the green area, the motor has not achieved synchronous speed: if the needle creeps slowly into the green area and exhibits no oscillation, there is mechanical overload, such for example as bearing trouble. If a single motor is replaced for any reason, only the multivibrator associated with that motor needs to be readjusted.

It will readily be appreciated that a permanent record can be made, at any particular time, that a motor started and ran properly, simply by substituting a recording instrument for the indicator associated with the motor in question.

Numerous objects and advantages of my invention have been set forth in the foregoing description, together with details of the structure and function of the invention, and the novel features thereof are pointed out in the appended claims.

The disclosure, however, is illustrative only, and I may make changes in detail, within the principle of the invention, to the full extent indicated by the broad general meanings of the terms in which the appended claims are expressed.

I claim as my invention:

1. The method of testing a hysteresis synchronous motor having a rotor and a pair of stator windings the first of which is energized directly from an alternating voltage source and the second of which is energized from the source through a capacitor, which comprises the steps of energizing the motor, monitoring the phase angle relation between the alternating voltage across said second winding and a reference alternating voltage of preset fixed phase, and confirming the presence in said relation of a characteristic representative of satisfactory motors.

2. The method of claim 1 in which said characteristic comprises a sudden rapid shift of 5° as synchronous speed is achieved.

3. The method of claim 1 in which said characteristic comprises a small oscillation when synchronous speed is achieved.

4. The method of claim 1 with the further preliminary steps of first operating the motor at synchronous speed, then setting the phase angle of the reference voltage, with respect to the signal voltage, at a predetermined value, then deenergizing the motor to bring it to rest.

5. In combination:
a hysteresis synchronous motor having a first winding energized directly from a source of alternating voltage and a second winding reactively energized from said source, the phase of the voltage across said second winding varying as the motor varies in speed;
means connected to said motor for deriving, from the voltage across said second winding, pulses of unidirectional current synchronized with one of the peaks thereof;
gating means adjustably synchronized with the voltage across said first winding for deriving from said pulses a unidirectional signal which is of a first sense when the motor is running at less than synchronous speed, and which reverses in sense as the motor reaches synchronous speed; and
indicating means energized with said unidirectional signal so that the indication thereof varies with variation in the speed of said motor.

* * * * *